United States Patent

Baumann

[15] 3,684,136
[45] Aug. 15, 1972

[54] RECEPTACLE HAVING A DIVIDING WALL

[72] Inventor: Erwin H. Baumann, Nendeln 108, F. Liechtenstein

[22] Filed: Feb. 22, 1971

[21] Appl. No.: 117,638

[52] U.S. Cl. ................... 222/386, 220/20.5, 206/47, 128/218 M
[51] Int. Cl. .............................................. B67d 5/42
[58] Field of Search........ 222/491, 94, 541, 386, 494, 222/190; 220/20.5, 85 B; 206/47; 215/6; 128/218 M, 272

[56] References Cited

UNITED STATES PATENTS 3,380,451   4/1968   Porter et al. .......... 128/218 M
3,490,437   1/1970   Bakondy et al. ............ 128/272
3,595,439   7/1971   Newby ....................... 222/386

*Primary Examiner*—Stanley H. Tollberg
*Attorney*—Christel & Bean

[57] ABSTRACT

A receptacle having at least two chambers for receiving and subsequently mixing the ingredients of dental preparations or other products. The pair of chambers are initially separated from each other by a dividing wall which has at least one weakened, substantially linear portion or notch arranged to rupture and form a gap for passage of one of the ingredients therethrough when bending or buckling forces are exerted upon the dividing wall, but upon termination of the action of such forces the gap formed will be automatically closed again to prevent reverse flow of ingredients.

25 Claims, 10 Drawing Figures

PATENTED AUG 15 1972 3,684,136

INVENTOR.
Erwin Baumann
BY
Christel & Bean
ATTORNEYS.

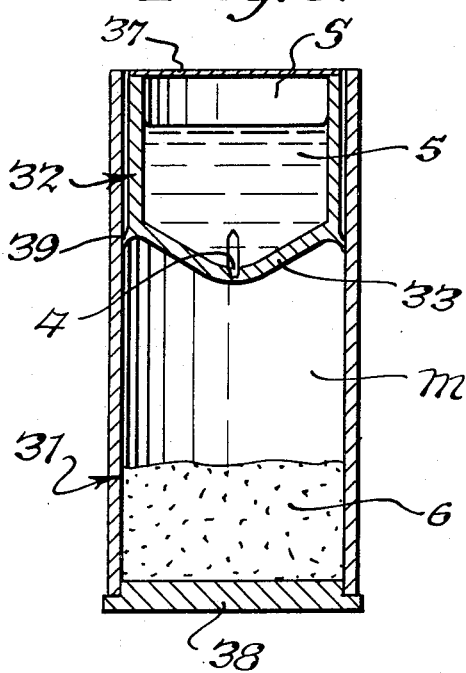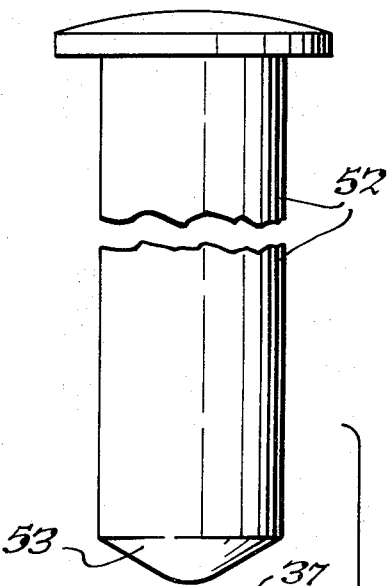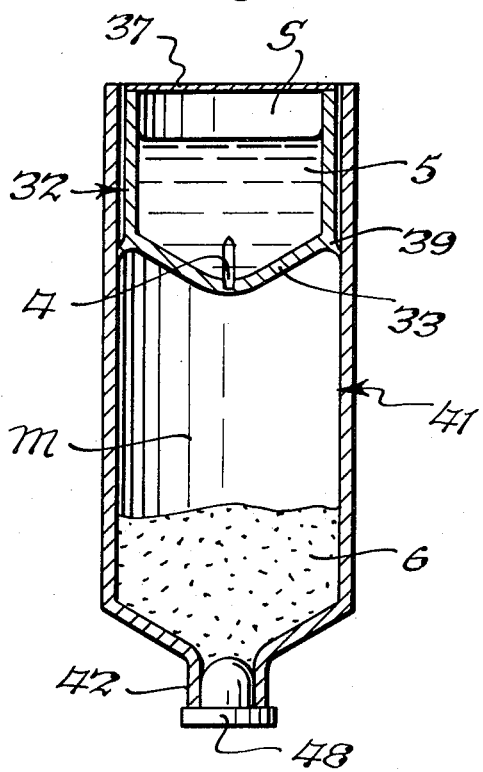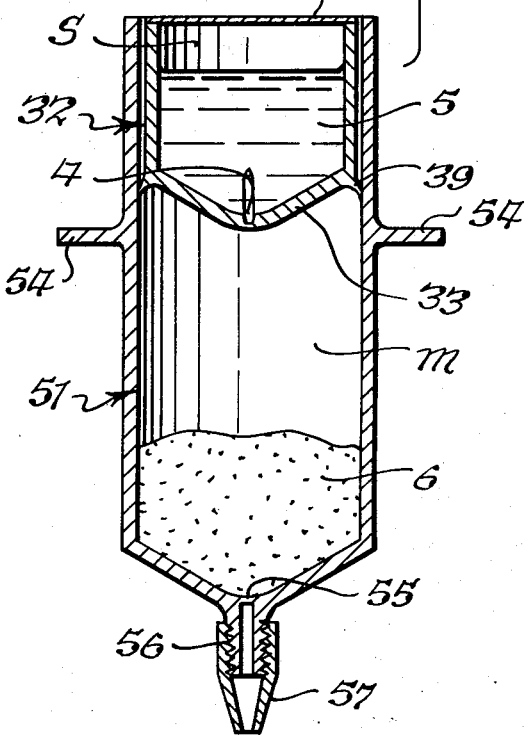

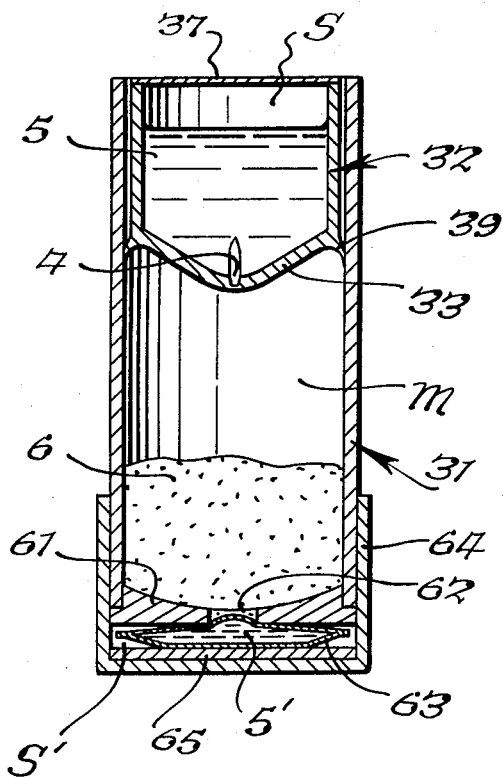
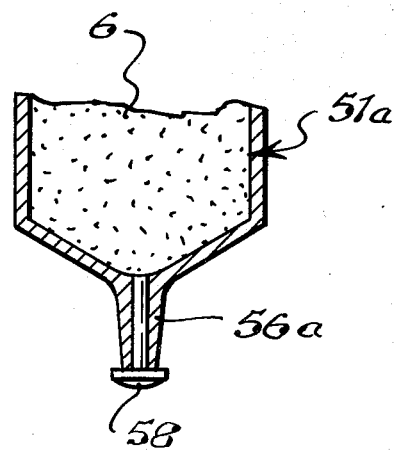
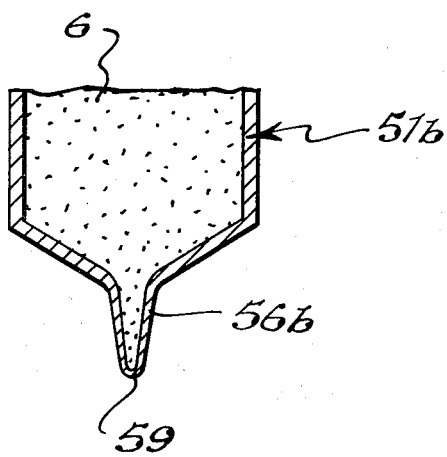

RECEPTACLE HAVING A DIVIDING WALL

This invention relates to receptacles having a dividing wall adapted to separate two chambers from each other.

It has been proposed heretofore to provide multichamber receptacles for receiving ingredients required to make a product such as a dental preparation ready for use, the substances being capable of reacting upon each other. Individual chambers of prior devices have been separated from each other by easily destroyable membranes; and the receptacle parts receiving different components to be mixed have been slidably arranged relative to each other. Instead of employing a membrane, a bag-shaped or tubular storage means may be provided in a top cover of the receptacle for receiving one of the components, the storage means being formed, e.g., by a closed, preferably welded pouch of foil. An intermediate member or separator having perforations and, if suitable, spikes facing the pouch of foil, may be arranged between the main or mixing chamber of the receptacle and the pouch. In receptacles of this type, the usually wall-shaped separator or the pouch of foil is caused to break or burst by moving parts of the receptacle towards each other, whereby the individual ingredients will be brought into mutual contact.

In an improved type of the prior receptacle, the pouch of foil which preferably contains a liquid such as phosphoric acid, is arranged to be practically emptied by squeezing or pressing so that the contents of the pouch will be injected into the main or mixing chamber; the latter preferably contains a pulverulent substance such as zinc oxide or silicate cement. This type of device has certain advantages; in particular, no foil particles will enter into the mixture.

However, it is difficult to enclose larger amounts of a liquid substance in a correspondingly large pouch of foil by welding since the wall thickness of relatively large pouches of foil which are normally produced by a deep-drawing operation cannot be kept precisely uniform so that such pouches may tear in a wrong area. This problem is of particular significance in the case of compound foil comprising plastics and metal since such foil is suitable for deep-drawing operations to a limited extent only. Moreover, the danger of faulty welding is greater in the case of a long welding seam. Even if the receptacle is relatively small, it is difficult to enclose certain liquids in a pouch of foil by welding since it is not certain to the necessary degree that a tight welding seam will be obtained. This problem is still more difficult when the liquid material comprises ethereal oils such as clove oil, bergamot oil, eugenol, or similar ethereal oils used in dentistry, or low-boiling organic liquids. These organic liquids include, for example, solvents such as benzine, chloroform, in general aromatic and aliphatic hydrocarbons which may be substituted if desired, carboxylic acids and esters thereof, aldehydes, ketones and the like, as well as hardenable compounds such as esters of acrylic or methacrylic acid. These liquid compounds are used in dentistry, e.g., in the preparation of fillings, dentures or parts thereof, crowns, bridges, fastening materials, and dental surgical dressings.

When using liquids of the type stated, therefore, it is advisable to depart from the step of welding a pouch of foil. Instead thereof, a simple rupturable separator in the form of a sheet of foil may be provided between the main chamber and the secondary chamber containing a liquid substance, as has been proposed heretofore. However, such arrangement has a disadvantage in that the substances when mixed may be contaminated by particles of foil which will be removable from the mixture only in a painstaking way.

In a modified mixing receptacle which is based on the same principle as employed in the last-mentioned type, two ingredients to be mixed are stored in a pair of tubular, telescoping members forming two chambers which are separated from each other by a rupturable, transverse dividing wall. One of the tubular members, that is, the inner member, is slideable in the outer tubular member and adapted to tear the rupturable dividing wall and force any individual torn flaps against the internal surface of the outer tubular member so that these flaps will be positioned between such internal surface and the external surface of the inner tubular member. To facilitate rupture, the dividing wall may be provided with weakened, substantially linear portions which may be arranged in the form of a star.

It is true that in this prior mixing receptacle the flaps of the torn dividing wall will be positioned between the telescoped tubular members in a manner such that the flaps will be prevented from contaminating the finished mixture, but it is a prerequisite for the construction of this mixing receptacle that the dividing wall is manufactured from thin foil material. Consequently, there is danger of the dividing wall tearing prematurely upon accidental application of pressure in the longitudinal direction of the receptacle, for example, during shipping, particularly if the dividing wall is weakened in certain places. This construction, therefore, is not entirely satisfactory, particularly in the case of larger receptacles.

It is an object of the invention to provide a mixing receptacle having a dividing wall which will sustain the stresses occurring during shipping, and which even after rupture will prevent foil particles from entering the finished mixture.

It is a further object of the invention to construct the dividing wall in a manner such that during the mixing operation the substances to be mixed are prevented from entering or reentering the secondary chamber arranged to initially receive a flowable substance or liquid.

Accordingly, the invention relates to a mixing receptacle which is adapted to receive substances for producing a mixture, in particular a dental preparation, the substances being capable of reacting upon each other, and which is provided with a main or mixing chamber for receiving a preferably pulverulent substance and further with at least one secondary chamber for initially receiving a liquid or flowable substance, the main and secondary chambers being separated from each other by a rupturable dividing wall. According to the invention, the dividing wall and, if suitable, adjacent wall portions cooperating with the dividing wall in forming at least one of said chambers, comprise a relatively strong, resilient material, and the dividing wall is provided with one or several weakened, substantially linear portions or notches where the dividing wall will rupture upon the application of buckling or bending forces so that one or more gaps will be formed; the strength and elasticity of the material of the dividing wall and, if suitable, of adjacent wall portions are selected so that the gap or gaps formed upon rupture of the weakened, substantially linear portions will be closed again after the action of buckling or bending forces has been terminated. If a plurality of weakened, substantially linear portions are provided in the dividing wall, they may be arranged in parallel or in the shape of a cross or star.

Mixing receptacles according to the invention are suitable in particular for accommodating a relatively large amount of a flowable substance or liquid. The term "flowable substance" refers in particular to liquids, the viscosity of which is relatively low so that due to the action of gravity or upon occurrence of a spinning or throwing motion they will be capable of flowing easily into the main or mixing chamber through the gap formed upon rupture of at least one weakened portion. If a plurality of weakened portions are provided and thus several gaps are formed, the flowable substance will be capable of flowing into the main or mixing chamber faster. In the case of substances having a higher viscosity, or substances which are solid at room temperatures, it is proper to heat the mixing receptacle so that entry of such substances into the main chamber will be facilitated or promoted.

Though the mixing receptacle according to the invention is suitable in particular for making dental preparations, it is also adapted for making certain other mixtures, e.g., adhesives or cements and medicinal mixtures.

For example, the flowable substance in the secondary chamber may be mercury, and the main chamber may contain silver filings. In this case the mixing receptacle will serve for producing amalgam. Further, the secondary chamber may contain phosphoric acid while the main chamber may contain pulverulent zinc oxide or silicate powder to make a dental cement. Likewise, the mixing receptacle according to the invention is suitable for producing synthetic resin mixtures. In the latter case the secondary chamber will contain a liquid compound capable of being polymerized, e.g., an ester of acrylic or methacrylic acid, while the main chamber will receive a pulverulent polymerisate and, if desired, a catalyst. Furthermore, the mixing receptacle according to the invention may be used for producing embedding materials or molding materials, e.g., of the type based on alginate or gypsum.

When lateral pressure is exerted upon wall portions forming the main chamber and/or the secondary chamber in an area adjacent to the dividing wall so as to compress the receptacle, bending or buckling stresses will be developed in the dividing wall so that the latter will tear at its weakened, substantially linear portion or portions, and the flowable substance will then pass from the secondary chamber into the main chamber. After both substances have been received in the main chamber, the receptacle will preferably be inserted in the fork of an automatic oscillating mixer, and an intimate mixing of the substances in the main chamber will be obtained with the aid of rapidly succeeding oscillations. If desired, however, the mixing operation may be performed by shaking the receptacle manually, in particular if the material in the main chamber is capable of flowing relatively easily. The finished mixture may be discharged in various ways as will be apparent from the subsequent description of various embodiments of receptacles according to the invention.

Preferably, the dividing wall of the mixing receptacle is convex at its bottom facing the main chamber and concave at its top facing the secondary chamber. The convex shape at the bottom will increase the resistance of the dividing wall to bending in the direction away from the main chamber. Thus, when the substances in the main chamber are thrown against the dividing wall during mixing, the dividing wall will not tend to deflect in the direction towards the secondary chamber, which would result in opening a previously closed gap again and would tend to enlarge such gap. Further, the concave shape at the top of the dividing wall will facilitate passage of the flowable substance from the secondary chamber to the main chamber.

The dividing wall and adjacent wall portions of the receptacle preferably comprise plastics, in particular polypropylene or polyethylene. It is also possible to employ plastics combined with one or more metal layers, or to use metal alone, e.g., sheet aluminum or sheet steel. In the case of such sheet metal, a weakened, substantially linear portion of the dividing wall may be obtained by arranging a gap in the metal passing therethrough and then covering such gap with thin metal foil secured in place by soldering or welding. The relation between the strength of the dividing wall proper and the strength at a weakened portion thereof is selected so that the weakened portion will tear before the bending or buckling forces reach a magnitude which would result in permanent deformation of the dividing wall proper or of an adjacent wall.

In one embodiment of the mixing receptacle according to the invention, the dividing wall forms a unit with other walls of the receptacle or is integral therewith, and means are provided for opening the main chamber for removal of the finished mixture upon completion of the mixing operation.

According to a further embodiment, the dividing wall may be represented by the bottom of a hollow member which has the secondary chamber therein and is inserted in a container forming the main chamber. The hollow member may be arranged in the container in a manner such that movement of the hollow member into the container is limited to a predetermined distance so that further movement into the container is prevented. To discharge the finished mixture, the main chamber may be opened either by extraction of the hollow member or by removal of a closure element at the bottom of the main chamber.

According to another preferred embodiment, the aforementioned hollow member having the second chamber therein is in the form of a piston movable in the main chamber to the lower end thereof which is provided with a removable closure element or with a nozzle-shaped extension adapted to be opened upon completion of the mixing operation to expel the finished mixture at the lower end of the main chamber. If a nozzle-shaped extension is employed, the mixing receptacle may serve as a syringe for applying the finished mixture precisely to a predetermined area. A cannula may be attached to the nozzle-shaped extension.

When using such nozzle-shaped extension, it is advisable to close the latter towards the main chamber during the mixing operation, which will prevent any accumulation of unmixed or only partly mixed material in the interior of the extension; the closure may be effected by means of a plug or by providing the bottom of the main chamber with a weakened portion to be removed or ruptured after the mixing operation.

To avoid undesired movements in the case of a hollow member of the piston type, an external projection of bead-like or other shape may be arranged on the hollow member at the lower edge thereof, or an internal, preferably bead-like projection may be arranged in the interior of the container forming the main chamber, the latter projection being located at the border between the main and secondary chambers in the initial position of the parts before advance of the hollow member.

It is of advantage to insert a movable ram in the hollow member if the latter is of the piston type. Preferably, the bottom of the ram has a shape complementary to that of the dividing wall. The ram will assist in pushing the hollow member or piston towards the lower end of the main chamber upon completion of the mixing operation and will thus facilitate ejection of the finished mixture through a nozzle-shaped extension. The container forming the main chamber may be provided with handles so that the receptacle may be held and manipulated like a syringe or squirt. Alternatively, the receptacle may be connected to, or inserted in, a separate ejecting or squeezing unit provided with a ram.

Other objects, features and advantages of the invention will become apparent as the description proceeds.

In the drawings which illustrate several embodiments of the invention by way of example, FIG. 1 is a longitudinal section through a receptacle according to the invention;

FIGS. 3 to 5 are longitudinal sections through other modified receptacles;

FIGS. 5a and 5b show modifications of the lower end of receptacles according to the invention; and FIG. 6 is a longitudinal section through a receptacle which is still further modified.

Figure 1:
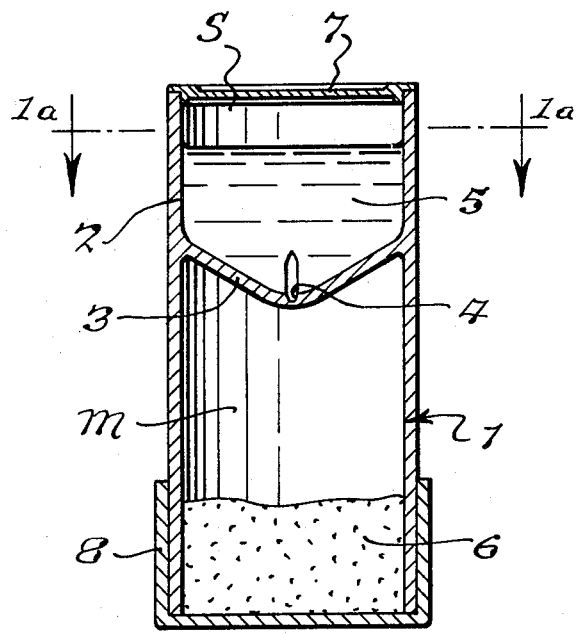
FIG. 1a is a cross-section taken along line 1a—1*l* of FIG. 1.
Figure 1A:
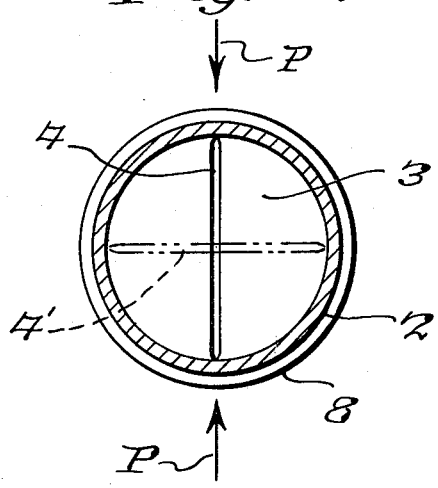

Referring to the embodiment of the invention illustrated in FIGS. 1 and 1a, the mixing receptacle shown therein has a relatively simple shape and is made from plastic such as polyethylene. The receptacle comprises a container generally indicated at 1 which forms a main or mixing chamber M adjacent its lower end, and an upper portion 2 of which surrounds a secondary chamber S. A dividing wall 3 extends across container 1 and is adapted to separate the main and secondary chambers from each other. In this embodiment, the dividing wall 3 forms a unit with adjacent wall portions of container 1 and is integral therewith. The lower surface of wall 3 facing the main chamber is convex and the top facing the secondary chamber is concave for the purposes stated hereinbefore. A weakened, substantially linear portion or notch 4 passes approximately through the center of wall 3 as best shown in FIG. 1a.

More than one weakened portion may be provided as indicated in chain lines at 4' in FIG. 1a, and the weakened portions may be arranged in the form of a cross as shown or in the form of a star or the like.

A flowable or liquid substance 5, e.g., an aqueous solution, is stored in the secondary chamber S while a preferably pulverulent substance 6, e.g., alginate, is stored in the main chamber M. The secondary chamber S is closed at the top by a cover 7 which is made from plastics and may be welded to the top of container 1 after the flowable substance has been received in chamber S. Alternatively, cover 7 may form a permanent unit with container 1 and may have an inlet opening to be closed after the flowable substance has been received in the secondary chamber. To close and open the lower end of main chamber M, a removable element such as a cap 8 may be provided.

If lateral pressure is exerted upon the receptacle adjacent to the dividing wall 3 in the direction of the arrows P or in the direction of a weakened portion thereof, the dividing wall will be forced downwardly by developed bending or buckling forces and will be caused to rupture at the weakened portion or portions 4, 4'. One or more gaps will be formed and the flowable substance 5 will pass therethrough from the secondary chamber S into the main chamber M. When the lateral pressure upon the receptacle is terminated, wall 3 will return substantially to its original shape and the gap or gaps formed will automatically be closed again. The strength and elasticity of the material of wall 3 and adjacent wall portions is selected so that the desired closing will be readily achieved even if several weakened portions are employed and several gaps have been formed.

After the flowable substance 5 has been transferred to chamber M, the receptacle is inserted or clamped in the fork of an automatic oscillating mixer to thoroughly mix the substances present in the main chamber M. Since the previously formed gap or gaps have been closed, the mixture is effectively prevented from flowing backwards into the secondary chamber during the mixing operation. When the latter is completed and cap 8 has been removed from container 1, the ready mixture may be discharged from chamber M.

The thickness of the dividing wall 3 proper and of adjacent wall portions may be on the order of 1 to 2 mm in the embodiment shown in FIGS. 1 and 1a, while the thickness of weakened portions of the dividing wall may amount approximately to 0.1 to 0.5 mm.

Though only one weakened, linear portion is described and shown in connection with each of the subsequent embodiments, it will be clear that a plurality of such weakened portions may be employed if desired.

Figure 2:
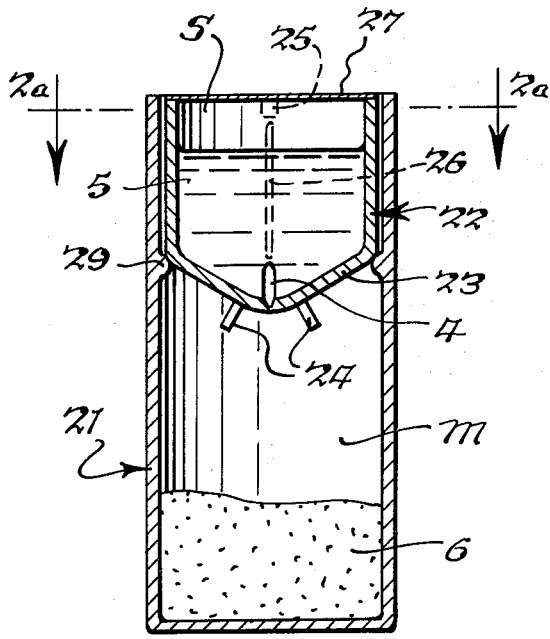
FIG. 2 is a longitudinal section through a modified receptacle.

FIG. 2 illustrates a modified embodiment of the mixing receptacle according to the invention, wherein the receptacle comprises a substantially tubular container 21 which is again provided with the main chamber M containing the preferably pulverulent substance 6. However, the secondary chamber S receiving the flowable substance 5 is positioned within an additional hollow member 22 which may have a shape similar to that of a bowl or cup and is inserted in the container 21. A dividing wall 23 forms the bottom of member 22 and again includes a weakened, substantially linear portion 4. A pair of short leg portions 24 may be arranged on wall 23 to determine the position of the hollow member 22 and the weakened portion 4 during the manufacture or assembly, particularly during mass production.

Figure 2A:
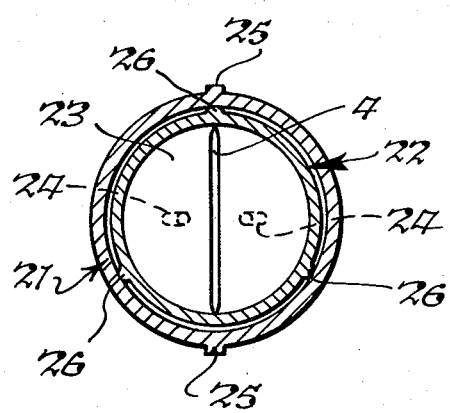
FIG. 2a is a cross-section taken along line 2a—2a of FIG. 2.

As best shown in FIG. 2a, the container 21 may be provided with a pair of opposite, outer projections 25 to indicate the direction in which the substantially linear portion 4 should be disposed during assembly. This is also the general direction in which, after the mixing operation, pressure should be exerted upon container 21. Further, the container may have small internal, longitudinal ribs 26 so that air may escape from chamber M through the spaces between the ribs when the hollow member 22 is introduced into the container. Instead of the ribs, three of which are illustrated in the drawings, shallow grooves may be provided in the container.

Though the parts 24, 25 and 26 are shown as applied to the embodiments according to FIGS. 2 and 2a only, it should be noted that they may be used likewise in connection with subsequent embodiments, the length of the internal ribs depending upon the extent of advance of the hollow member.

The secondary chamber S is closed at its top by means of a disk 27 of foil or by another suitable cover.

To prevent the hollow member 22 from advancing too far into container 21 in the embodiment of FIGS. 2 and 2a, the internal wall of the container has a bead-shaped projection 29 therein for engagement with member 22.

If lateral pressure is exerted upon container 21 in the region of the dividing wall 23 and in the direction of the weakened linear portion 4 as generally indicated by the projections 25, wall 23 will rupture at the weakened portion and the flowable substance 5 will pass from chamber S to chamber M. The mixing operation is carried out as described in connection with the embodiment of FIGS. 1 and 1a. Upon completion of the mixing operation, the hollow member 22 will be lifted out of container 21 for removal of the mixture, the container being closed at its lower end by an integral bottom portion.

Referring to FIG. 3, the embodiment shown comprises a tubular container 31 having chamber M and the substance 6 therein, a hollow member 32 containing the secondary chamber S and the flowable substance 5, and a dividing wall 33 forming the bottom of member 32, the dividing wall being again provided with a weakened, substantially linear portion 4. A disk 37 of foil serves to close chamber S at its top. In this embodiment the hollow member 32 is in the form of a piston movable in container 31 through the main chamber M to the lower end thereof. The hollow member or piston 32 has an external projection 39 in the region of its bottom for frictional engagement with the internal wall of container 31. This projection which is smaller than the internal projection 29 of container 21 in FIG. 2, will assist in preventing undesired movements of the piston in container 31 and will further serve as a sealing lip. Instead of arranging the projection 39 on the piston, a small bead-like projection may be provided on the interior wall of the container.

A removable cover 38 is located at the lower end of container 31. Upon completion of the mixing operation, cover 38 will be removed and piston 32 will be advanced to the lower end of the main chamber M to expel the ready mixture from the receptacle.

The embodiment illustrated in FIG. 4 is similar to the embodiment of FIG. 3 and reference numerals 4, 5, 6, 32, 33, 37, 39 relate to the same parts. As shown in FIG. 4, however, the container 41 is narrowed at its lower end to form a neck portion 42 in which a removable plug 48 is inserted. This arrangement renders it possible to apply the ready mixture to a predetermined area after plug 48 has been pulled out of the neck portion 42. Further, it is possible to push a nozzle or a cannula upon the neck portion or to secure such parts by means of screw threads, compare the cannula illustrated in FIG. 5.

In the embodiment according to FIG. 5 the mixing receptacle has the form of a syringe or squirt, but is otherwise again similar to the arrangement of FIG. 3. Thus, the hollow member or piston 32 having the chamber S and the flowable substance 5 therein is adapted to be advanced to the lower end of a container 51 in which the main chamber M and the preferably pulverulent substance 6 are positioned. As in FIG. 3, piston 32 is provided with an external projection 39. Advancement of the piston will take place after its bottom wall 33 has been ruptured at the weakened portion 4 thereof, and after the flowable substance 5 has been passed into the main chamber M and the mixing operation has been completed. A ram 52 insertable in chamber S is provided to assist in pushing the piston 32 downward into chamber M. Preferably, bottom 53 of the ram 52 has a shape complementary to that of the bottom wall 33 of piston 32. The foil disk 37 shown at the top of piston 32 may be removed before ram 52 is inserted in chamber S; however, this is not absolutely necessary since instead thereof, disk 37 may be penetrated and pushed downward into chamber S by means of ram 52. If desired, ram 52 may be inserted in the secondary chamber S before the receptacle is agitated to mix the ingredients, and in this case the receptacle and the ram 52 may be placed together in a mixer. As will be apparent from the foregoing description, piston 32 will be pushed down to the lower end of chamber M by means of ram 52 only after the mixing operation has been completed.

A pair of lateral handle portions 54 are provided on the container 51 so that the receptacle may be supported by two fingers for manipulation as a syringe or squirt. The handle portions may be omitted if the receptacle is to be inserted in a squeezing or ejecting device having a movable ram.

The bottom of container 51 includes a relatively thin portion 55 which will be pierced from below, e.g., with the aid of a pointed metal tool, when the ready mixture is to be discharged from the receptacle through a nozzle-shaped extension shown at 56. A cannula 57 may be attached to the nozzle-shaped extension so that the ready mixture when squirted may be directed precisely to a desired area.

A ram of the type shown at 52 or a similar ram may also be used in connection with the embodiments according to FIGS. 3 and 4 to assist in pushing the hollow, piston-like member 32 downwards to the lower end of the main chamber M.

FIG. 5a illustrates a modification of the lower part of a mixing receptacle according to the invention, the receptacle being of the type wherein the ready mixture is ejected at the lower end of the main chamber. The arrangement is similar to that shown in FIG. 5 in that a container 51a is provided with a nozzle-shaped extension 56a; however, the latter is not closed by a thin portion at the bottom of the container, but by means of a removable plug 58 which extends through the entire length of extension 56a when in place therein. Plug 58 will be removed after the mixing operation has been completed.

Due to the effect of the bottom portion 55 or the elongated plug 58 in the embodiments of FIGS. 5 and 5a the nozzle-shaped extension is closed towards the main chamber M during mixing so that particles which have not as yet been thoroughly mixed will be prevented from entering the narrow passage within the nozzle-shaped extension, which would render the production of a homogeneous mixture difficult.

FIG. 5b illustrates the lower part of a mixing receptacle having a container 51b provided with a nozzle-shaped extension 56b which is open at its top even before and during the mixing operation and at that time is closed only at its lower tip 59. An arrangement of this type will be used preferably in the case of a mixture of low viscosity since under such conditions the mixing operation will proceed without difficulty. The embodiment of FIG. 5b has an advantage in that the manufacture of the receptacle is simplified. To open the container 51b after the mixing operation, it is sufficient to cut off the tip 59 of extension 56b by means such as shears or a pair of scissors.

FIG. 6 shows a mixing receptacle, the upper part of which is identical with the upper part of the receptacle according to FIG. 3, whereas the lower part of the container 31 is provided with a wall 61 perforated at 62 and defining the main chamber M at the lower end thereof. In the embodiment shown, the perforated wall 61 bears against the end of container 31, but the perforated wall may be in the form of an insert removably positioned in the interior of the container if desired. Outside chamber M and below wall 61 there is provided a sealed pouch of foil 63 containing an additional flowable substance 5', that is, a third substance to be mixed with the flowable substance 5 and the preferably pulverulent substance 6. The upper side of pouch 63 bears against the perforated wall 61 while the lower side is operatively in contact with an element such as a cap 64 which is movably mounted on container 61 and arranged to hold the pouch in place and to encompass the latter around the circumference thereof so that an additional chamber S' is formed. A disk 65 of resilient material may be located between the pouch of foil 63 and the cap 64.

In this embodiment the flowable substance or liquid 5 may be a monomeric compound capable of being polymerized; the preferably pulverulent substance 6 may be a polymerisate; and the flowable substance or liquid 5' sealed in the pouch of foil 63 may be a catalyst dissolved in an organic solvent. To mix these substances, first the dividing wall 33 is ruptured by lateral pressure upon the receptacle so that the flowable substance 5 may pass into the main chamber M. Cap 64 is then subjected to pressure and shifted in the direction towards the perforated wall 61 and pouch of foil 63 so that the latter will burst and the flowable substance 5' will be injected into main chamber M through the opening 62 of wall 61. It is of advantage to turn the receptacle around while performing these steps, in particular before causing the pouch of foil to burst.

Thereafter, the ingredients present in the main chamber M will be thoroughly mixed, whereupon chamber M will be opened either by taking out the piston 32 or by removing the perforated wall 61 (if the latter is in the form of a loose insert or is otherwise easily detachable) so that the ready mixture may be discharged. If desired, a ram similar to the ram 52 shown in FIG. 5 may here again be inserted in the secondary chamber S after rupture of the dividing wall 33 to assist in pushing the piston 32 to the lower end of chamber M after the cap 64, the disk 65 and the pouch of foil 63 have been removed. During this mode of operation, in the course of which piston 32 is pushed down, the perforated wall 61 may remain in place on container 31 and for this purpose may be secured thereto by frictional engagement or suitable fastening means. In this case, the finished mixture will be ejected from chamber M through the opening 62 of wall 61.

Instead of rupturing the dividing wall 33 first and then causing the pouch of foil 63 to burst, the sequence may be reversed.

Various other modifications and changes may be made without departing from the scope of the invention as defined in the appended claims. Instead of the disk 27 or 37 of foil (FIGS. 2 to 6) or of a similar flat cover, for e ample, a cap or the like may be provided to close the secondary chamber at its top. Such cap may have a sealing member therein and may be provided with screw threads. If suitable, other movable members may likewise be threaded, for example, cap 64 (FIG. 6) located at the bottom of the receptacle. It is further possible to replace cap 64 by a movable ram if the perforated wall 61 is in the form of an insert positioned together with the pouch 63 in the interior of container 31.

Preferably, the dividing wall 3, or 23, or 33, has the approximate shape of a circular cone but if desired, the wall may be V-shaped in cross-section so that the lower edge of the wall will be substantially straight and, in upright position of the receptacle, horizontally disposed. In the case of a hollow circular cone, each weakened substantially linear portion 4 will extend along a curved line on the conical surface, but in the case of a V-shaped cross-section the substantially linear portion 4 will be located at the generally straight lower edge of the wall. Further, while each weakened portion 4 is shown in FIGS. 1a and 2a as extending across approximately the entire width of the dividing wall, the relative length of the weakened portion may be reduced, e.g., to half of that indicated in the drawings.

The thickness of walls forming the secondary chamber S will depend upon the type of substance to be stored therein. In the case of an aqueous solution, a limited thickness may be sufficient, whereas in the case of a monomer or the like a substantially greater thickness will be required to resist vapor pressures.

Where "foil" is referred to herein, it should be understood that, instead of metal foil, plastics such as thin plastics in the form of film, or combinations of metal foil and such plastics, may be used if suitable.

Instead of polypropylene and polyethylene, polymers of similar type and of comparable strength and elasticity may likewise be used for the purposes of the invention.

In the appended claims, the term "first substance" refers to a material which is preferably pulverulent, and the term "buckling forces" is to be understood as generally including bending or buckling forces. The term "linear" as used herein applies to arrangements along straight lines, as well as curved lines.

What is claimed is:

1. In a receptacle provided with a main chamber adapted to receive a first substance and further provided with at least one secondary chamber adapted to initially receive a second, flowable substance to be subsequently mixed in said main chamber with said first substance for producing a mixture such as a dental preparation, said substances being capable of reacting upon each other; dividing wall means in said receptacle for normally separating said main and secondary chambers from each other, said dividing wall means having at least one weakened, substantially linear portion; and additional wall means located adjacent to said dividing wall means and cooperating with the latter in forming at least one of said chambers; said dividing wall means comprising material of a strength and elasticity such that when predetermined buckling forces act thereon, said dividing wall means will rupture along said weakened portion and a gap will be formed therein for transfer of said second substance from said secondary chamber to said main chamber, but upon termination of the action of said buckling forces said gap will be closed to again separate said main and secondary chambers from each other.

2. A receptacle as defined in claim 1, wherein said additional wall means comprises a material of a strength and elasticity on the order of said strength and elasticity of the dividing wall means.

3. A receptacle as defined in claim 1, wherein at least one of said wall means comprises a plastic such as polypropylene, polyethylene and the like.

4. A receptacle as defined in claim 1, wherein at least one of said wall means comprises metal.

5. A receptacle as defined in claim 1, wherein at least one of said wall means comprises a plastic combined with at least one metal layer.

6. A receptacle as defined in claim 1, wherein said weakened portion of the dividing wall means is shaped so as to form a notch in the latter.

7. A receptacle as defined in claim 1, wherein the strength of said weakened, substantially linear portion relative to the strength of other portions of said dividing wall means and to the strength of said additional wall means is such that said weakened portion will rupture before occurrence of any permanent deformation in said other portions and in said additional wall means.

8. A receptacle as defined in claim 1, wherein said dividing wall means comprises a convex portion facing said main chamber; said convex portion being effective to increase resistance of said dividing wall means to bending in the direction away from said main chamber.

9. A receptacle as defined in claim 8, wherein said dividing wall means comprises a concave portion facing said secondary chamber to facilitate egress of said flowable substance from said secondary chamber.

10. A receptacle as defined in claim 1, including a ram movable into said secondary chamber, said ram being provided with a bottom having a shape complementary to the shape of said dividing wall means.

11. A receptacle as defined in claim 1, including a perforated wall defining said main chamber at one end thereof remote from said secondary chamber; a pouch located outside said main chamber with one of its sides contacting said perforated wall, said pouch being adapted to contain a third, flowable substance; and an element movably mounted on said receptacle and arranged to operatively contact the other side of said pouch so as to hold the latter in place, said element being shiftable towards said perforated wall and said pouch to exert pressure thereon and cause said pouch to burst.

12. A receptacle as defined in claim 11, wherein said movable element is in the form of a cap.

13. In a receptacle provided with a main chamber adapted to receive a first substance and further provided with at least one secondary chamber adapted to initially receive a second flowable substance to be subsequently mixed in said main chamber with said first substance for producing a mixture such as a dental preparation, said substances being capable of reacting upon each other; a container having said main chamber therein adjacent one of its ends and having said secondary chamber therein adjacent its other end; a dividing wall forming a unit with said container and extending across the latter intermediate the ends thereof so as to normally separate said main and secondary chambers from each other; and at least one weakened, substantially linear portion in said dividing wall of said unit; said dividing wall comprising material of a strength and elasticity such that when predetermined buckling forces act thereon, said dividing wall will rupture along said weakened portion and a gap will be formed therein for transfer of said second substance from said secondary chamber to said main chamber, but upon termination of the action of said buckling forces said gap will be closed to again separate said main and secondary chambers from each other.

14. A receptacle as defined in claim 13, wherein said dividing wall is integral with said container.

15. A receptacle as defined in claim 14, wherein the thickness of said dividing wall in general is on the order of 1 to 2 mm, but the thickness of said weakened portion thereof is on the order of 0.1 to 0.5 mm.

16. A receptacle as defined in claim 13, including a removable element for closing and opening said one end of the container.

17. In a receptacle provided with a main chamber adapted to receive a first substance and further provided with at least one secondary chamber adapted to initially receive a second, flowable substance to be subsequently mixed in said main chamber with said first substance for producing a mixture such as a dental preparation, said substances being capable of reacting upon each other; a container having said main chamber therein adjacent one of its ends; a hollow member inserted in said container at the other end thereof and having said secondary chamber therein; a bottom wall on said hollow member, said bottom wall being adapted to normally separate said main and secondary chambers from each other; and at least one weakened, substantially linear portion in said bottom wall of the hollow member; said bottom wall comprising material of a strength and elasticity such that when predetermined buckling forces act thereon, said bottom wall will rupture along said weakened portion and a gap will be formed therein for transfer of said second substance from said secondary chamber to said main chamber, but upon termination of the action of said buckling forces said gap will be closed to again separate said main and secondary chambers from each other.

18. A receptacle as defined in claim 17, wherein said hollow member is bowl-shaped.

19. A receptacle as defined in claim 17, wherein said container has an internal, bead-like projection therein positioned intermediate the ends of said container and adapted to engage said hollow member.

20. A receptacle as defined in claim 17, wherein said hollow member has an external projection thereon for engaging said container when inserted in the latter.

21. A receptacle as defined in claim 20, wherein said external projection is located in the area of said bottom of the hollow member.

22. A receptacle as defined in claim 17, wherein said container is of substantially tubular shape.

23. A receptacle as defined in claim 17, wherein said hollow member is in the form of a piston movable through said main chamber to said one end of the container.

24. A receptacle as defined in claim 23, including a closure element at said one end of the container, said closure element being removable for expelling the contents of said main chamber therefrom by means of said hollow member.

25. A receptacle as defined in claim 23, including a nozzle-shaped extension at said one end of the container for squirting contents of said main chamber through said nozzle-shaped extension by means of said hollow member.

* * * * *

UNITED STATES PATENT OFFICE
CERTIFICATE OF CORRECTION

Patent No. 3,684,136          Dated August 15, 1972

Inventor(s) Erwin Baumann

It is certified that error appears in the above-identified patent and that said Letters Patent are hereby corrected as shown below:

In the heading, the following should be inserted

[30] Foreign Application Priority Data

February 27, 1970 Germany . . . . . P 20 09 403.5

Signed and sealed this 10th day of July 1973.

(SEAL)
Attest:

EDWARD M. FLETCHER, JR.       Rene Tegtmeyer
Attesting Officer                 Acting Commissioner of Patents